(12) United States Patent
Chen et al.

(10) Patent No.: US 12,019,261 B2
(45) Date of Patent: Jun. 25, 2024

(54) ILLUMINANT CIRCUIT BOARD, BACKLIGHT MODULE AND LIGHTING KEYBOARD

(71) Applicant: DARFON ELECTRONICS CORP., Taoyuan (TW)

(72) Inventors: Chao-Yu Chen, Taoyuan (TW); Heng-Yi Huang, Taoyuan (TW); Hsin-Cheng Ho, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 18/128,261

(22) Filed: Mar. 30, 2023

(65) Prior Publication Data

US 2023/0305214 A1 Sep. 28, 2023

Related U.S. Application Data

(63) Continuation-in-part of application No. 17/873,128, filed on Jul. 25, 2022.
(Continued)

(30) Foreign Application Priority Data

Aug. 25, 2021 (TW) .................................. 110131417
May 19, 2022 (CN) .......................... 202210556007.6
Mar. 25, 2023 (TW) .................................. 112111307

(51) Int. Cl.
*H01H 13/83* (2006.01)
*F21V 8/00* (2006.01)
*H01H 13/704* (2006.01)

(52) U.S. Cl.
CPC ......... *G02B 6/0031* (2013.01); *G02B 6/0021* (2013.01); *G02B 6/006* (2013.01);
(Continued)

(58) Field of Classification Search
CPC .... G02B 6/0031; G02B 6/0021; G02B 6/006; H01H 13/704; H01H 13/83; H01H 2219/039; H01H 2219/044
See application file for complete search history.

(56) References Cited

U.S. PATENT DOCUMENTS 2,953,668 A 9/1960 Bassett, Jr.
3,103,659 A 9/1963 Edwards
(Continued)

FOREIGN PATENT DOCUMENTS

CN 101514801 A 8/2009
CN 201758091 U 3/2011
(Continued)

OTHER PUBLICATIONS

English translation of Liang CN-105321758-A, published Feb. 2016 (Year: 2016).*
(Continued)

*Primary Examiner* — Evan P Dzierzynski
(74) *Attorney, Agent, or Firm* — Winston Hsu

(57) ABSTRACT

A back light module is applied to a lighting keyboard with a plurality of keyswitches and includes a lighting unit, a light guide plate, a light penetrating membrane, a light calibration layer and an adhering component. The light guide plate has an opening used to accommodate the lighting unit. The light penetrating membrane is located on the light guide plate. The light penetrating membrane is located on the light penetrating membrane and has a second contour. The adhering component is located between the light guide plate and the light penetrating membrane, and has a first contour greater than the second contour. The adhering component includes a front region, a rear region and a hollow region. The front region is covered by the light calibration layer. The rear region is partly covered or not covered by the light
(Continued)

calibration layer. The hollow region corresponds to and is larger than the opening.

23 Claims, 11 Drawing Sheets

Related U.S. Application Data

(60) Provisional application No. 63/378,261, filed on Oct. 4, 2022, provisional application No. 63/368,272, filed on Jul. 13, 2022, provisional application No. 63/325,623, filed on Mar. 31, 2022.

(52) U.S. Cl.
CPC .......... *H01H 13/704* (2013.01); *H01H 13/83* (2013.01); *H01H 2219/039* (2013.01); *H01H 2219/044* (2013.01)

(56) References Cited

U.S. PATENT DOCUMENTS

| | | | |
|---|---|---|---|
| 3,157,771 A | 11/1964 | Roeser | |
| 3,467,802 A | 9/1969 | Martin | |
| 3,639,745 A | 2/1972 | Shiki | |
| 4,346,275 A | 8/1982 | Iwakiri | |
| 4,535,396 A | 8/1985 | Guthrie | |
| 4,722,028 A | 1/1988 | Brannon | |
| 5,150,257 A | 9/1992 | Mohabbatizadeh | |
| 5,434,377 A | 7/1995 | Martin | |
| 6,210,010 B1 | 4/2001 | Pontetti | |
| 6,558,013 B2 | 5/2003 | Tholin | |
| 6,743,993 B1 | 6/2004 | Clark | |
| 9,040,856 B2 | 5/2015 | Chen | |
| 9,214,301 B2 * | 12/2015 | Chen | H01H 3/125 |
| 9,299,515 B2 | 3/2016 | Chen | |
| 10,276,327 B2 | 4/2019 | Chen | |
| 10,586,664 B2 | 3/2020 | Yeh | |
| 11,036,306 B2 | 6/2021 | Cheng | |
| 11,257,638 B2 | 2/2022 | Liang | |
| 11,371,676 B2 | 6/2022 | Huang | |
| 11,409,373 B2 | 8/2022 | Cheng | |
| 11,443,907 B2 | 9/2022 | Ho | |
| 11,515,107 B2 | 11/2022 | Chen | |
| 11,538,641 B2 | 12/2022 | Liang | |
| 11,762,142 B2 | 9/2023 | Chen | |
| 2009/0140891 A1 | 6/2009 | Ragusa | |
| 2011/0037730 A1 | 2/2011 | Wang | |
| 2012/0275193 A1 | 11/2012 | Yoshida | |
| 2014/0166457 A1 | 6/2014 | Chen | |
| 2015/0332874 A1 * | 11/2015 | Brock | H01H 11/00 29/622 |
| 2017/0352504 A1 | 12/2017 | Chen | |
| 2018/0012714 A1 * | 1/2018 | Chen | H01H 13/7065 |
| 2018/0106956 A1 * | 4/2018 | Wang | G02B 6/0068 |
| 2019/0027326 A1 | 1/2019 | Tsai | |
| 2019/0369744 A1 | 12/2019 | Wu | |
| 2019/0371538 A1 | 12/2019 | Huang | |
| 2020/0402748 A1 | 12/2020 | Cheng | |
| 2021/0012984 A1 * | 1/2021 | Chen | H01H 13/83 |
| 2021/0082642 A1 * | 3/2021 | Ho | H01H 13/705 |
| 2023/0047235 A1 | 2/2023 | Chen | |
| 2023/0317386 A1 | 10/2023 | Huang | |

FOREIGN PATENT DOCUMENTS

| | | | |
|---|---|---|---|
| CN | 203377146 U | | 1/2014 |
| CN | 104252987 A | | 12/2014 |
| CN | 105321758 A | * | 2/2016 |
| CN | 106301323 A | | 1/2017 |
| CN | 106783308 A | | 5/2017 |
| CN | 110335775 A | | 10/2019 |
| CN | 214310968 U | | 9/2021 |
| CN | 113632249 A | | 11/2021 |
| JP | 2019-139728 | | 8/2019 |
| TW | I269993 | | 1/2007 |
| TW | M321552 | | 11/2007 |
| TW | M334393 | | 6/2008 |
| TW | 200945114 | | 11/2009 |
| TW | M395202 U1 | | 12/2010 |
| TW | I416565 B | | 11/2013 |
| TW | 201419343 A | | 5/2014 |
| TW | I494960 B | | 8/2015 |
| TW | I527075 B | | 3/2016 |
| TW | I598918 B | * | 8/2016 |
| TW | M548881 U | | 9/2017 |
| TW | I604484 B | | 11/2017 |
| TW | 201824318 A | | 7/2018 |
| TW | I632577 B | | 8/2018 |
| TW | I725894 | | 4/2021 |
| TW | 202143270 A | | 11/2021 |
| TW | 202211277 A | | 3/2022 |
| TW | I760181 B | | 4/2022 |

OTHER PUBLICATIONS

English translation of Yeh TW-I598918-B published Aug. 2016 (Year: 2016).*

Huang, the specification, including the claims, and drawings in the U.S. Appl. No. 18/330,342, filed Jun. 6, 2023.

Huang, the specification, including the claims, and drawings in the U.S. Appl. No. 18/127,667, filed Mar. 29, 2023.

Liu, the specification, including the claims, and drawings in the U.S. Appl. No. 18/297,020, filed Apr. 7, 2023.

Liu, the specification, including the claims, and drawings in the U.S. Appl. No. 18/128,235, filed Mar. 30, 2023.

Chen, the specification, including the claims, and drawings in the U.S. Appl. No. 18/369,217, filed Sep. 18, 2023.

Chen, the specification, including the claims, and drawings in the U.S. Appl. No. 18/368,538, filed Sep. 14, 2023.

Chen, the specification, including the claims, and drawings in the U.S. Appl. No. 18/368,021, filed Sep. 14, 2023.

Liu, the specification, including the claims, and drawings in the U.S. Appl. No. 18/131,885, filed Apr. 7, 2023.

Chen, the specification, including the claims, and drawings in the U.S. Appl. No. 18/376,818, filed Oct. 4, 2023.

* cited by examiner

ILLUMINANT CIRCUIT BOARD, BACKLIGHT MODULE AND LIGHTING KEYBOARD

CROSS REFERENCE TO RELATED APPLICATION

This application is a continuation-in-part of U.S. application Ser. No. 17/873,128, filed on Jul. 25, 2022. Further, this application claims the benefit of U.S. Provisional Application No. 63/325,623, filed on Mar. 31, 2022. Further, this application claims the benefit of U.S. Provisional Application No. 63/378,261, filed on Oct. 4, 2022. Further, this application claims the benefit of U.S. Provisional Application No. 63/368,272, filed on Jul. 13, 2022. The contents of these applications are incorporated herein by reference.

BACKGROUND OF THE INVENTION

1. Field of the Invention

The present invention relates to a lighting keyboard, and more particularly, to a lighting keyboard and a related backlight board and a related light board with illumination uniformity that takes into account both keycap character and keycap contour.

2. Description of the Prior Art

In an illumination mode, a plurality of keyswitches of a lighting keyboard is illuminated by light emitted from a backlight module and through a character on a keycap, so that the character on each keycap can be clearly illuminated. However, a plurality of characters of the keycap is not all located on a central area on a top surface of the keycap. Although the illuminated characters can be recognized by the user to find out the character intended to be taped, the lighting keyboard has a hundred keyswitches with different sizes and shapes and different characters, and it is difficult to form the halo with high uniformity around the contour of each keycap.

SUMMARY OF THE INVENTION

According to one embodiment of the claimed invention, a backlight module is disclosed and includes a light penetrating membrane, a reflection layer, an lighting unit, a light guide plate and an adhering component. The light penetrating membrane has an optical block, an optical frame, and a light penetrating area defined between the optical block and the optical frame. The reflection layer is located under the light penetrating membrane. The lighting unit is located under the light penetrating membrane, and protrudes from the reflection layer. The light guide plate is located between the light penetrating membrane and the reflection layer, the light guide plate has a light entrance hole adapted to accommodate the lighting unit. The adhering component at least partly surrounds the light entrance hole of the light guide plate, the adhering component defines a non-glued annular area, the non-glued annular area is located between the adhering component and the lighting unit. Wherein, the optical block is located above the lighting unit, and a distance between the non-glued annular area and the optical frame of the light penetrating membrane is greater than a distance between the optical block and the optical frame.

According to one embodiment of the claimed invention, the reflection layer includes at least one pair of micro patterns separately located on two sides of the lighting unit. In one embodiment, the light guide plate has an edge wall with a light leaking feature, a distance between the non-glued annular area and the edge wall of the light guide plate is greater than a distance between the adhering component and the edge wall. In one embodiment, the reflection layer includes at least one pair of micro patterns separately located on two sides of the lighting unit, the adhering component comprises an island glue, the island glue is at least partly overlapped with at least one of the pair of micro patterns. In one embodiment, the adhering component includes a main glued body and a subordinate glued body, the main glued body at least partly surrounds the lighting unit, and the main glued body has a hole, the subordinate glued body is at least partly overlapped with the hole. In one embodiment, the reflection layer includes at least one core micro pattern disposed adjacent to the lighting unit, wherein the core micro pattern is overlapped with at least one of the non-glued annular area, the main glued body, the subordinate glued body, and the hole of the main glued body. In one embodiment, a distance between the subordinate glued body and the optical frame is smaller than a distance between the non-glued annular area and the optical frame. In one embodiment, the backlight module further includes a tunnel penetrating through the backlight module, the tunnel is not located in a fan-typed area stretched from the lighting unit and the hole of the main glued body. In one embodiment, the reflection layer includes at least one pair of micro patterns separately located on two sides of the lighting unit, and at least one of the non-glued annular area, the adhering component, the main glued body, the subordinate glued body, and the hole of the main glued body is located between the pair of micro patterns. In one embodiment, the backlight module is adapted to illuminate at least one character of a lighting keyboard, a distance between the subordinate glued body and the character is smaller than a distance between the main glued body and the optical frame. In one embodiment, the backlight module is adapted to illuminate a main character of a lighting keyboard, and the optical block of the light penetrating membrane is partly overlapped with the main character. In one embodiment, the backlight module is adapted to illuminate a main character of a lighting keyboard, and the main character is located between the optical block and the optical frame. In one embodiment, the backlight module is adapted to illuminate two characters of a lighting keyboard, the non-glued annular area is located between the two characters. In one embodiment, the backlight module is adapted to illuminate a character of a lighting keyboard, and the adhering component has a hole, a fan-typed area is stretched from the lighting unit and the hole, the character is at least partly overlapped with the fan-typed area. In one embodiment, the optical block is at least partly overlapped with one of the non-glued annular area and the adhering component. In one embodiment, the backlight module includes at least one pair of guide wires located under the reflection layer, the adhering component is located between the non-glued annular area and one of the at least one pair of guide wires, a distance between the non-glued annular area and the foresaid guide wire is greater than a distance between the adhering component and the foresaid guide wire. According to another embodiment of the claimed invention, a lighting keyswitch is discloses and includes a keycap and a backlight module as the foresaid embodiment mentioned above. The keycap includes at least one character; the backlight module is disposed under the keycap, adapted to provide a beam for illuminating the character.

According to another embodiment of the claimed invention, a backlight module is disclosed and includes a light penetrating membrane, a reflection layer, an lighting unit, a light guide plate and an adhering component. The light penetrating membrane has an optical block, an optical frame, and a light penetrating area defined between the optical block and the optical frame; the reflection layer is located under the light penetrating membrane, two micro patterns are separately disposed on an upper surface of the reflection layer; the lighting unit is located under the light penetrating membrane, and protrudes from the reflection layer; the light guide plate is located between the light penetrating membrane and the reflection layer, the light guide plate has a light entrance hole adapted to accommodate the lighting unit; the adhering component is located above the reflection layer, the adhering component at least partly surrounds the lighting unit, and the adhering component is located between the two micro patterns. According to another embodiment of the claimed invention, a lighting keyswitch is discloses and includes a keycap and a backlight module as the foresaid embodiment mentioned above. The keycap includes at least one character; the backlight module is disposed under the keycap, adapted to provide a beam for illuminating the character.

According to one embodiment of the claimed invention, an illuminant circuit board includes a substrate, an illuminant circuit, at least one lighting unit, a reflection layer and an adhering component. The illuminant circuit is located on the substrate, the illuminant circuit includes at least one pair of guide wires at least not partly overlapped with each other; the lighting unit is electrically connected to the at least one pair of guide wires; the reflection layer covers the illuminant circuit, two micro patterns are separately disposed on an upper surface of the reflection layer; the adhering component is disposed above the reflection layer, the adhering component at least partly surrounds the lighting unit, and the adhering component is located between the two micro patterns.

According to the backlight module of an embodiment of the claimed invention, the adhering component includes a main glued body and a subordinate glued body, the main glued body at least partly surrounds the lighting unit, and the main glued body has a hole, the subordinate glued body is at least partly overlapped with the hole. In one embodiment, the subordinate glued body is located between the main glued body and one of the at least one pair of guide wires, a distance between the subordinate glued body and the foresaid guide wire is smaller than a distance between the main glued body and the foresaid guide wire. In one embodiment, the reflection layer includes at least one core micro pattern disposed adjacent to the lighting unit, the core micro pattern is at least partly located between the adhering component and the lighting unit. In one embodiment, the adhering component includes an island glue, the island glue is at least partly overlapped with at least one of the pair of micro patterns. According to another embodiment of the claimed invention, a backlight module is disclosed and includes a light penetrating membrane, a light guide plate, and an illuminant circuit board as the foresaid embodiment mentioned above. The light penetrating membrane has an optical block, an optical frame, and a light penetrating area defined between the optical block and the optical frame; the light guide plate is located under the light penetrating membrane, the light guide plate has a light entrance hole corresponding to the optical frame; the illuminant circuit board is located under the light guide plate.

The illuminant circuit board, the backlight module and the lighting keyswitch of the present invention can utilize optical features of the adhering component to focus on the light output position of the character and the light leaking position of the tunnel and the edge wall of the light guide plate, and supplemented by optimized relative configuration of the main glued body, the subordinate glued body, the hole, the non-glued annular area, the optical block, the optical frame, the micro optical layer and the micro pattern and the core micro pattern and the island glue, etc., so that the whole lighting keyswitch has preferred illumination uniformity and preferred halo continuity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
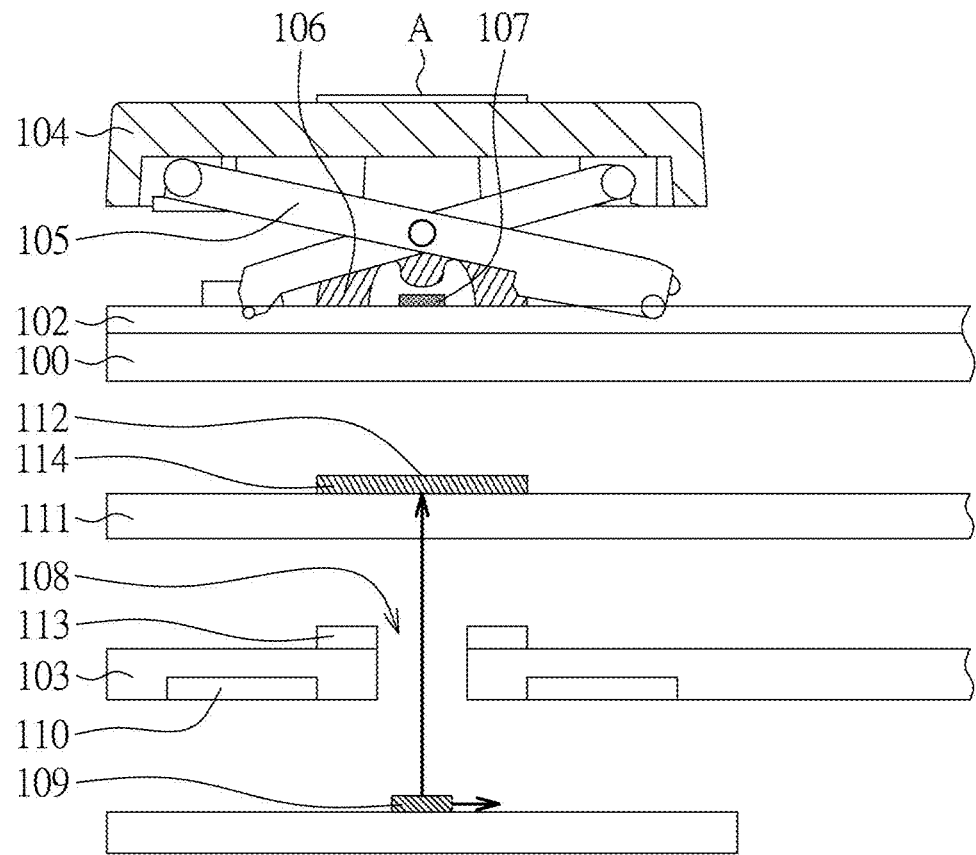
FIG. 1 is an exploded diagram of a part of a lighting keyboard according to an embodiment of the present invention.
Figure 2:
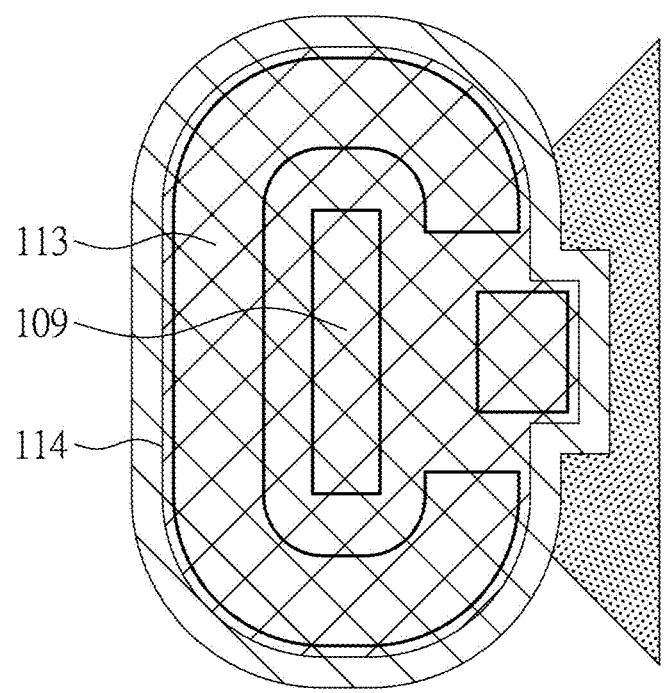
FIG. 2 is a diagram of relation between a lighting unit, a light calibration layer and an adhering component according to the embodiment of the present invention.

Please refer to FIG. 1 and FIG. 2. FIG. 1 is an exploded diagram of a part of a lighting keyboard 10 according to an embodiment of the present invention. FIG. 2 is a diagram of relation between a lighting unit 26, a light calibration layer 36 and an adhering component 34 according to the embodiment of the present invention. The lighting keyboard 10 can include a plurality of keyswitches 12. A number and arrangement of the keyswitch 12 are designed in accordance with a language family of the lighting keyboard 10, and a detailed description is omitted herein for simplicity.

The lighting keyboard 10 can include a illuminant circuit board 14, a thin film circuit board 16, a back light module, a resilient recovering component 20, a lift supporting mechanism 22, a substrate 23 and a keycap 24. The lighting unit 26 can be located on the illuminant circuit board 14. The thin film circuit board 16 can have a plurality of switches 28. The illuminant circuit board 14, the thin film circuit board 16 and the substrate 23 are overlapped with each other. The lift supporting mechanism 22 can support the keycap 24 so that the keycap 24 can be moved relative to the switch 28. The lift supporting mechanism 22 can be located on the substrate 23.

The back light module 18 can include a light guide plate 30, a light penetrating membrane 32, the adhering component 34, the lighting unit 26 and the light calibration layer 36. The light guide plate 30 can have an opening 38 used to accommodate the lighting unit 26. The keyswitch 12 can be located above the lighting unit 26. The lighting unit 26 can emit an illumination beam toward the light guide plate 30 in a first direction D1, and the illumination beam can be transmitted to the plurality of keycaps 24 in a second direction D2 via micro-prisms (which are not shown in the figures) of the light guide plate 30. The first direction D1 can be substantially perpendicular to the second direction D2. The light penetrating membrane 32 can cover above the light guide plate 30, and a dimension of the light penetrating membrane 32 can be similar to a dimension of the light guide plate 30. The adhering component 34 can be located between the light guide plate 30 and the light penetrating membrane 32 for adhesion. The adhering component 34 can include a hollow region 341. A position of the hollow region 341 can correspond to a position of the opening 38, and a size of the hollow region 341 can be greater than a size of the opening 38. In the present invention, the adhering component 34 can be made by light transmission and light guide material, such as hydrogel, so that a part of the illumination beam can be projected onto a character A on the keycap 24 in the second direction D2 through the adhering component 34. As shown in FIG. 2, the adhering component 34 can have a first contour 34A, and the light calibration layer 36 can have a second contour 36A smaller than the first contour 34A. The adhering component 34 can include a front region 342 distributed along the first direction D1 of the lighting unit 26, and further include a rear region 343 distributed along a third direction D3 of the lighting unit 26. The adhering component 34 is fully or approximately overlapped with the light calibration layer 36 over the front region 342. The light calibration layer 36 is not overlapped with the rear region 343 of the adhering component 34. The adhering component 34 can provide an unexposed region 344, and the illumination beam can be projected onto the character A in the second direction 2 via the unexposed region 344.

The light calibration layer 36 can be a dark color coating layer with a light sheltering function, such as a black ink, which can shelter parts of the illumination beam transmitted in the second direction D2 and therefore still allow some part of the illumination beam transmitted in the second direction D2; further, the light calibration layer 36 can be a light color coating layer with a light partially penetrating function, such as a white ink, and parts of the illumination beam can be transmitted toward the keyswitch through the white ink. Besides, the light calibration layer 36 may include one or plural light penetrating dots 361 used to adjust a quantity of the illumination beam projected onto the keycap 24. A material, a dimension, a thickness and a shape of the light calibration layer 36 are not limited to the embodiment shown in the figures, and depend on a design demand. The keycap 24 of one of the plurality of keyswitches 12 can vary an overlapped degree between the light calibration layer 36 and the adhering component 34 to adjust illumination uniformity of the character A.

Figure 3:
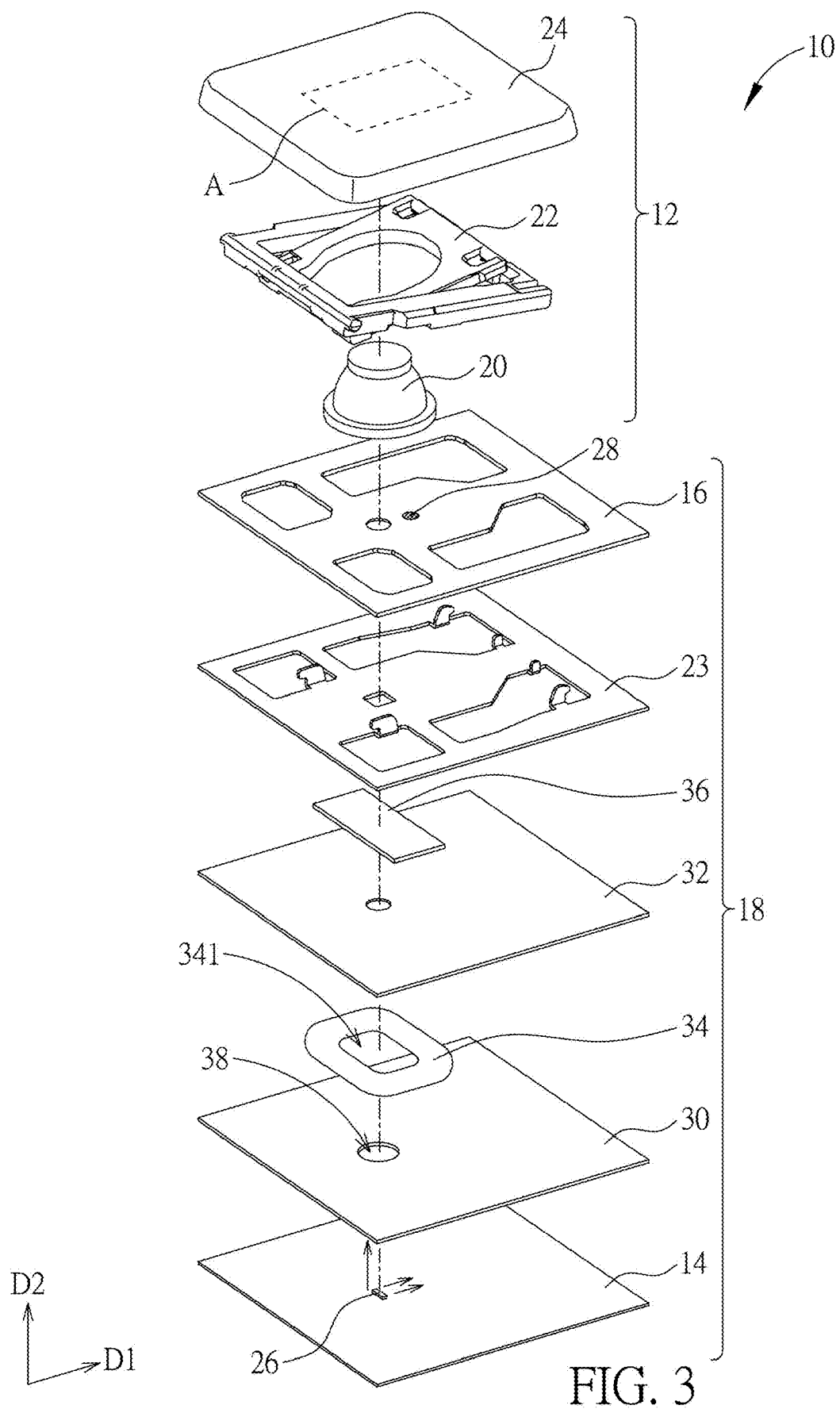
FIG. 3 is a diagram of relation between the lighting unit, the light calibration layer and the adhering component according to another embodiment of the present invention.

Please refer to FIG. 3. FIG. 3 is a diagram of relation between the lighting unit 26, the light calibration layer 36 and the adhering component 34 according to another embodiment of the present invention. In this embodiment, the adhering component 34 can include a first adhesion body 54 and a second adhesion body 56. The first adhesion body can be a C-typed form. The second adhesion body 56 can be a rectangle form smaller than the C-typed form. The illumination beam emitted by the lighting unit 26 can be transmitted toward a hole 54A formed on the first adhesion body 54, such as transmitted in the first direction D1. The second adhesion body 56 can be located adjacent to the hole 54A of the first adhesion body 54. The second adhesion body 56 can be fully covered by the light calibration layer 36. The light calibration layer 36 can include a main portion 58 and a protruding portion 60. The protruding portion 60 can be a trapezoid form and used to fully cover the second adhesion body 56.

In addition, the light calibration layer 36 can optionally include one or plural light penetrating holes 62. The light penetrating hole 62 can be formed on the protruding portion 60 of the light calibration layer 36, and used to slightly increase an illumination intensity of the character A on the keycap 24. In other possible embodiments, the light penetrating hole 62 may be formed on the main portion 58 of the light calibration layer 36, and a position, a size and distribution of the light penetrating hole 62 can depend on the design demand.

Figure 4:
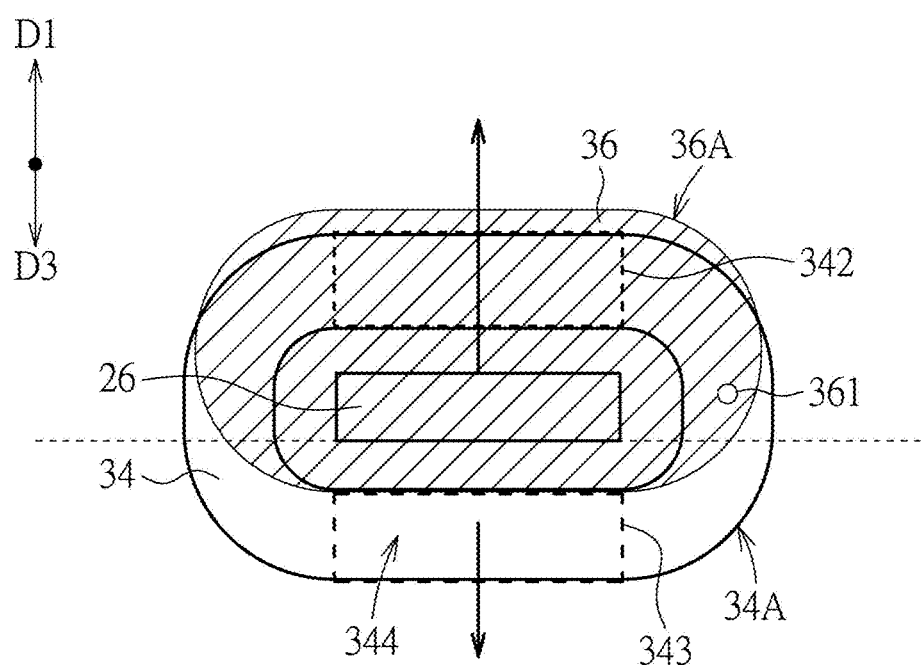
FIG. 4 is a diagram of relation between the lighting unit, the light calibration layer and the adhering component according to another embodiment of the present invention.

Please refer to FIG. 4. FIG. 4 is a diagram of relation between the lighting unit 26, the light calibration layer 36 and the adhering component 34 according to another embodiment of the present invention. In this embodiment, elements having the same numerals as ones of the foresaid embodiment have the same positions and functions, and the detailed description is omitted herein for simplicity. The adhering component 34 of the embodiment can have the front region 342 approximately overlapped with the light calibration layer 36; however, the light calibration layer 36 may slightly protrude from the adhering component 34 in the first direction D1. The adhering component 34 can have the rear region 343 partly overlapped with the light calibration layer 36, and further have the unexposed region 344 not overlapped with the light calibration layer 36. The illumination beam can be transmitted toward the character A in the second direction D2 through the unexposed region 344 of the adhering component 34. The adhering component 34 of the embodiment can have the first adhesion body 54 and the second adhesion body 56. The first adhesion body can be the C-typed form, and the second adhesion body 56 can be the rectangle form smaller than the C-typed form. The illumination beam emitted by the lighting unit 26 can be transmitted toward the hole 54A of the first adhesion body 54. The second adhesion body 56 can be located adjacent to the hole 54A of the first adhesion body 54. The main portion 58 of the light calibration layer 36 can be smaller than the first adhesion body 54 of the adhering component 34. The protruding portion 60 of the light calibration layer 36 can be the rectangle form and not fully overlapped with the second adhesion body 56 of the adhering component 34.

In conclusion, the back light module and the lighting keyboard of the present invention can utilize a light guiding property of the adhering component to be an auxiliary illumination source, so that the character of the keyswitch above the lighting unit can have preferred illumination intensity. The front region of the adhering component can be fully covered by the light calibration layer, and the rear region of the adhering component can be partly covered by the light calibration layer, or the rear region of the adhering component cannot be covered by the light calibration layer. Therefore, a front side and a rear side of the keycap of the lighting keyswitch can have the preferred illumination intensity no matter where the lighting unit is in the light guiding module, and the lighting keyswitch can provide the preferred illumination uniformity and halo continuity.

Figure 5:
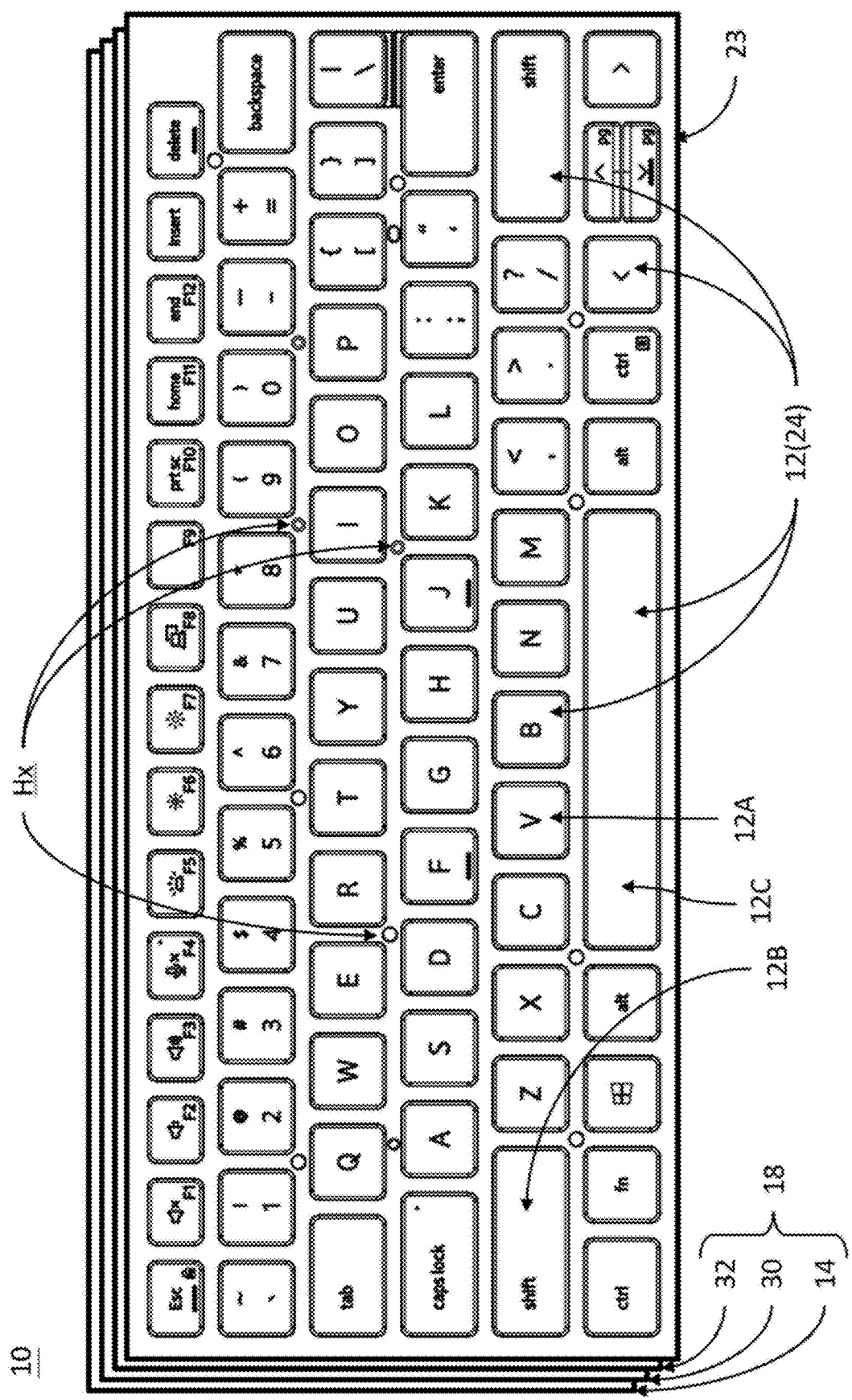
FIG. 5 is a multiple overlapped diagram of the lighting keyboard and a backlight module according to a derivative embodiment of the present invention.
Figure 6:
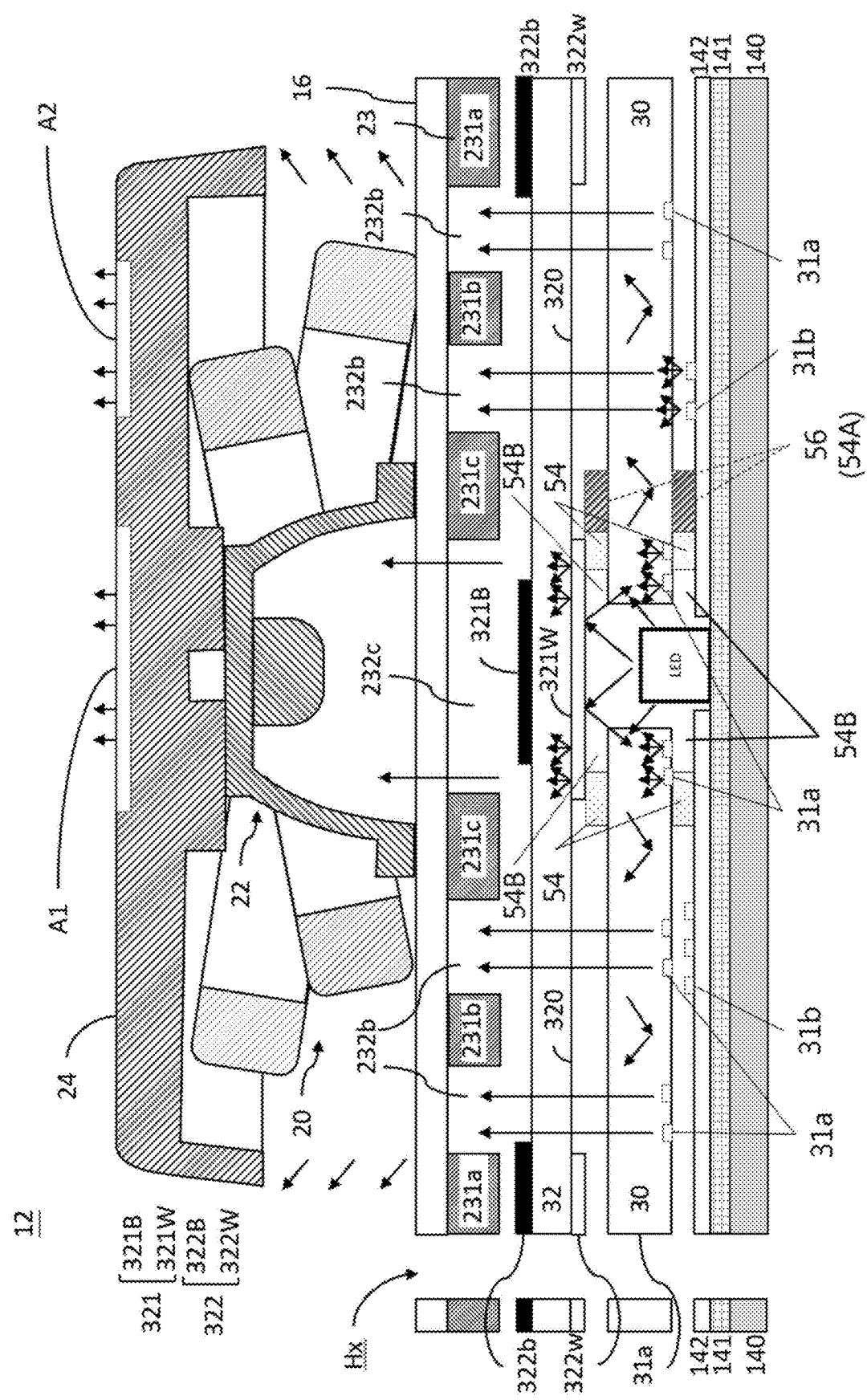
FIG. 6 is a partial sectional view of one keyswitch of the lighting keyboard according to the embodiment shown in FIG. 5.
Figure 7:
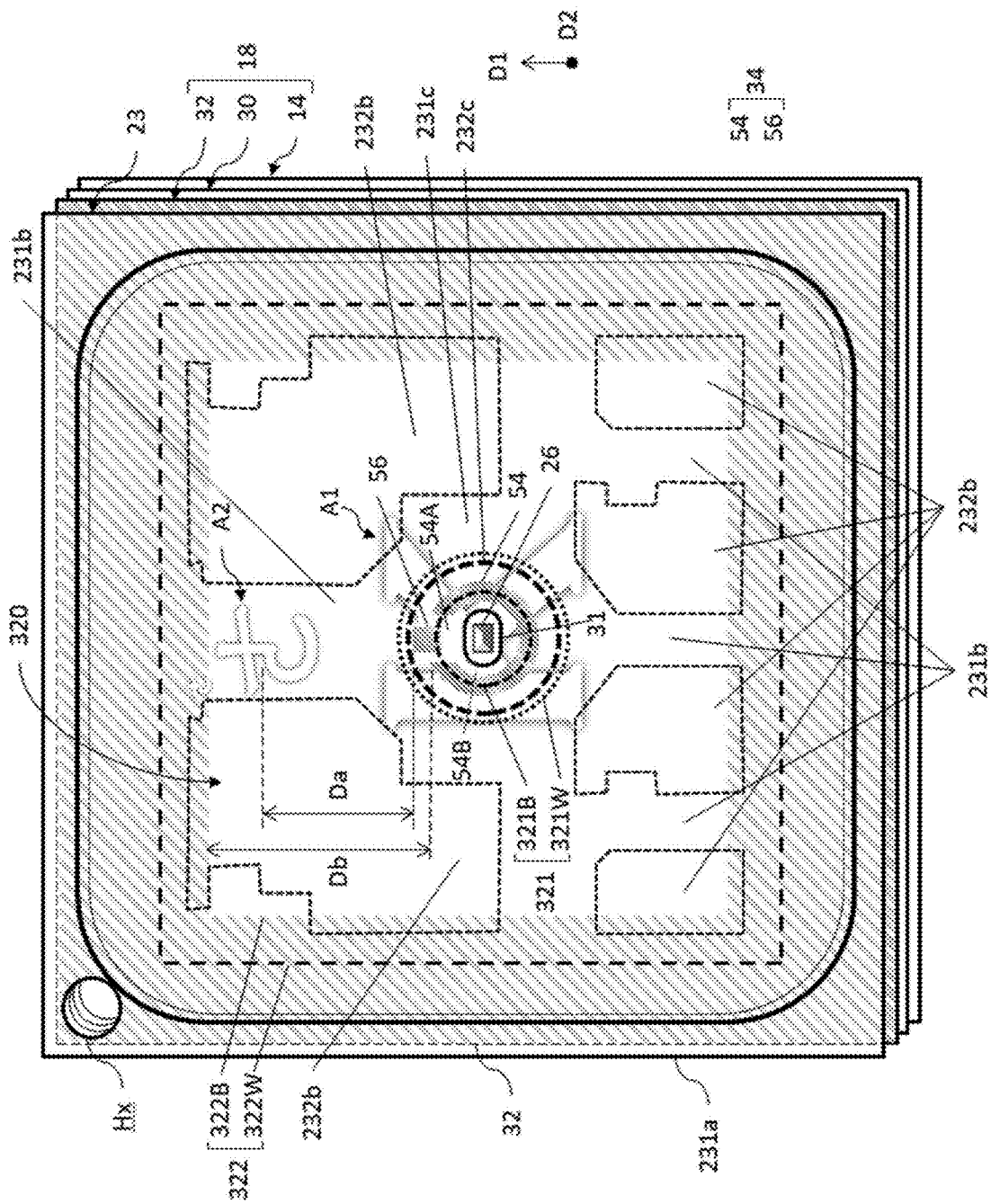
FIG. 7 is a partial overlapped diagram of one keyswitch of the lighting keyboard according to the embodiment shown in FIG. 5.
Figure 8:
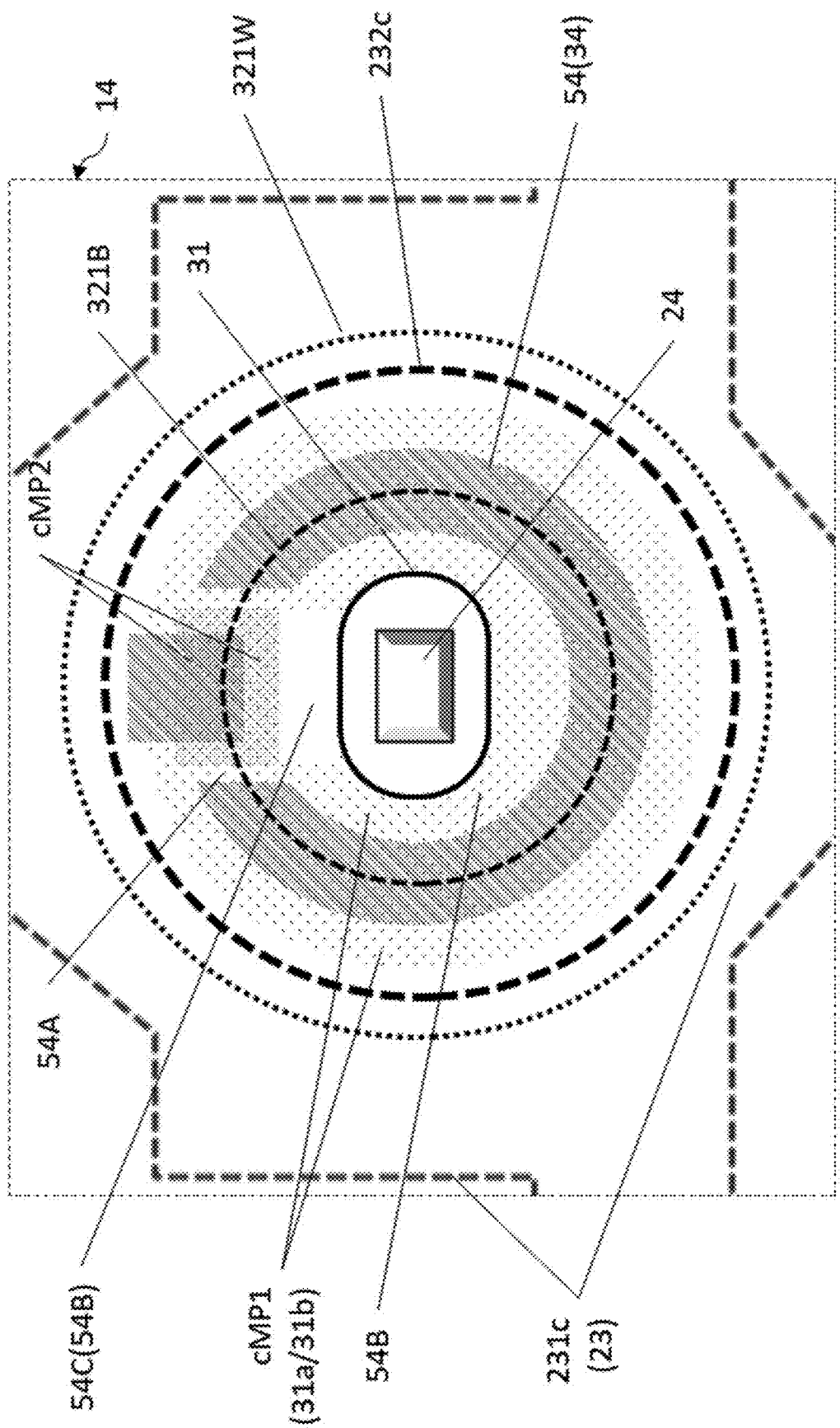
FIG. 8 is a partial top view of one keyswitch of an illuminant circuit board according to the embodiment shown in FIG. 5.
Figure 9:
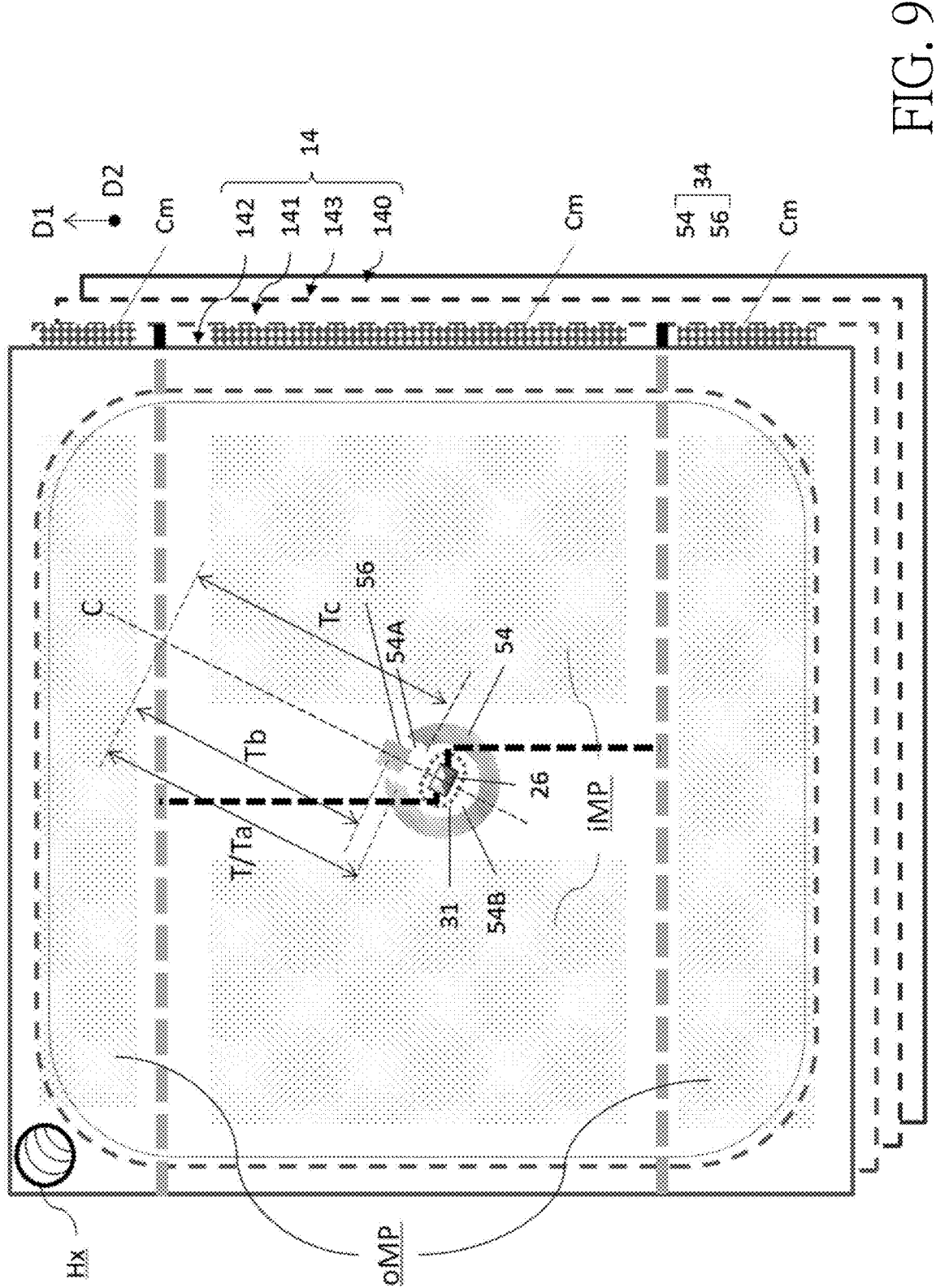
FIG. 9 is a multiple overlapped diagram of one keyswitch of the illuminant circuit board according to the embodiment shown in FIG. 5.

For increasing light output uniformity of a main character and a subordinate character, and halo uniformity around edges of the plurality of keyswitches, following embodiments are provided for different design demands. Refer to FIGS. 5, 6, 7, 8, 9. FIG. 5 is a multiple overlapped diagram of the lighting keyboard 10 and a backlight module 18 according to a derivative embodiment of the present invention. FIG. 6 is a partial sectional view of one keyswitch 12 of the lighting keyboard 10 according to the embodiment shown in FIG. 5. FIG. 7 is a partial overlapped diagram of one keyswitch 12 of the lighting keyboard according to the embodiment shown in FIG. 5. FIG. 8 is a partial top view of one keyswitch 12 of an illuminant circuit board according to the embodiment shown in FIG. 5. FIG. 9 is a multiple overlapped diagram of one keyswitch 12 of the illuminant circuit board 14 according to the embodiment shown in FIG. 5.

Refer to FIGS. 5/6/7. The lighting keyboard 10 includes the plurality of keyswitches 12 and the backlight module 18. Each keyswitch 12 includes a keycap 24, a base plate 23, a resilient recovering component 20 and a lift supporting mechanism 22 connected between the keycap 24 and the base plate 23 (which are only shown in FIG. 6), and a thin-film circuit board 16 located under the keycap 24 and adapted to generate a keyswitch signal in accordance with the keycap 24 being pressed (which are only shown in FIG. 6). The thin-film circuit board 16, the resilient recovering component 20 and the lift supporting mechanism 22 can have a light penetrating feature. The keyswitch 12 and the keycap 24 can have different shapes and different sizes, such as the square keys 12A (which means the single-sized keys), the multi-sized keys 12B and other function keys. The keycap 24 can have one or several characters as being a light output area of the keycap 24, such as the main character A1 and the subordinate character A2; some keyswitch 12 does not have the character, for example, the keycap 24 of a space key 12C shown in FIG. 5 does not have the light output area. In addition to the character of the keycap 24 as being the light output area, the four lateral sides of the keycap 24 of each keyswitch 12 can also have light leakage, so that the user can see rectangular halo to identify the boundary of the keyswitch 12 and the keycap 24. The base plate 23 has a side frame 231a, a plurality of bridging ribs 231b and an annular rib 231c. The plurality of bridging ribs 231b is respectively connected between the annular rib 231c and the side frame 231a, so as to define a plurality of side holes 232b and an inner hole 232c that can be penetrated by light.

Refer to FIGS. 5/6/7. The backlight module 18 is disposed under the keyswitch 12, and includes an illuminant circuit board 14, the light guide plate 30 and the light penetrating membrane 32. At least one lighting unit 26 is on the illuminant circuit board 14 corresponding to position under each keyswitch 12 and each keycap 24 of the lighting keyboard 10. In order to control illuminant position and areas of the backlight module 18, the light penetrating membrane 32 includes a light penetrating area 320, an optical block 321 and an optical frame 322; wherein the optical block 321 is adjacent to the center area of the keycap 24 (or its projection). The optical frame 322 is around an inner side and an outer side of a contour area of the keycap 24. The light penetrating area 320 is around the optical block 321, and the light penetrating area 320 is located between the optical block 321 and the optical frame 322. As the light adjustment layer 36 introduced in the foresaid embodiment, the optical block 321 located above the lighting unit 26 can include a light sheltering block 321b (such as a dark or black coating) and a reflection block 321w (such as white or metal coating). The light sheltering block 321b absorbs the light or is not penetrated by the light. Apart of the reflection block 321w is penetrated by the light, and other part of the reflection block 321w is partly reflective or total reflective (the high light reflectivity means the low light transmittance). The optical frame 322 is similar to the foresaid light adjustment layer 36, and includes a light sheltering frame 322b (such as the dark or black coating) and a reflection frame 322w (such as the white or metal coating). An aperture of the optical frame 322 defines an outer boundary of the light penetrating area 320, and is also used to control an amount of light output of the halo around the keycap 24; an outer diameter of the optical block 321 defines an inner boundary of the light penetrating area 320, a beam of the lighting unit 26 has to be transmitted horizontally and outwardly to exceed the light sheltering block 321b for having an opportunity to partially emit the light, or the light is transmitted continuously and outwardly to exceed the reflection block 321w for fully emitting the light through the light penetrating area 320. In other embodiment, especially when the lighting unit 26 is a color light source or a multi-color light source, the optical block 321 can include a color block with the light penetrating feature, which can be adjusted for the illumination uniformity and/or light mixing effect.

Refer to FIGS. 5/6/7. The light guide plate 30 is located between the optical film 32 and the illuminant circuit board 14, in detail, the light guide plate 30 is located between the reflection block 321w and the reflection frame 322w of the optical film 32 and the reflection layer 142 of the illuminant circuit board 14, so as to recycle the beam to the light guide plate 30 as much as possible. When the lighting unit 26 is the mini LED or the micro LED with lower luminous power, it is important to provide effective recycle and horizontal transmission of the beam. A micro optical layer 31a can be disposed on a top surface or a bottom surface of the light guide plate 30, and adapted to guide the beam upwardly for diffusion. The micro optical layer 31a can include micro patterns having a plurality of micro optics (such as the metal coating or the white coating), or the micro patterns having concave-convex microstructures, and a top view or a sectional view of each of the micro patterns can be a micro dot, a micro line or any shapes. The micro optical layer 31a is usually disposed under the area with the light penetrating feature, such as the light penetrating area 320 of the optical film 32, and the plurality of side holes 232b and the inner hole 232c of the base plate 23. In terms of a function of recycling the beam and guiding the beam, similar design can be disposed on the reflection layer 142 of the illuminant circuit board 14, such as the micro optical layer 31b. In principle the micro optical layer 31 and the micro optical layer 31b are disposed in parallel to the light guide plate 30 and the illuminant circuit board 14, and the micro optical layer 31 and the micro optical layer 31b can be alternatively disposed or simultaneously disposed for multiplier effect, the micro optical layer 31 and the micro optical layer 31b can be also disposed on position that does not transmit the beam, for example, when the micro optical layer 31 and the micro optical layer 31b are overlapped with the side frame 231a, the plurality of bridging ribs 231b and the annular rib 231c of the base plate 23, the effect of recycling and diffusing the beam can be increased, so that more beams can be transmitted to the lateral side or corner positions of the light penetrating area 320 and the keycap 24.

Refer to FIGS. 6/8/9. The illuminant circuit board 14 includes a substrate 140, an illuminant circuit 141 and a reflection layer 142, the illuminant circuit 141 is located between the reflection layer 142 and the substrate 140, the lighting unit 26 is electrically connected to the illuminant circuit board 14 and the illuminant circuit 141, and the lighting unit 26 is protruded from the reflection layer 142. The illuminant circuit board 14 and the related illuminant circuit 141 can be circuit boards corresponding to the whole size of the lighting keyboard 10, or a soft circuit board with a striped shape. Regardless of a size of the illuminant circuit board 14, the sizes of the reflection layer 142 and the light guide plate 30 above the reflection layer 142 and the light penetrating membrane 32 above the reflection layer 142 correspond to the whole size of the lighting keyboard 10. For preventing material from thermal expansion and contraction in a manufacturing process or in an use environment, or reducing interference of the illuminant circuit board 14 by a systematic radio frequency signal, the substrate 140 can be made of metal substrate, in the meantime, an isolation layer 143 can be located between the illuminant circuit 141 and the substrate 140 to ensure normal operation of the illuminant circuit 141. Refer to FIG. 9. The illuminant circuit 141 can further include a cupper mesh Cm adapted to provide structural rigidity, or provide radio frequency shielding. The micro optical layer 31b is appeared on a surface of the reflection layer 142 due to existence of the cupper mesh Cm; even in an embodiment without the cupper mesh Cm, the micro optical layer 31b can utilize size control of reflective particle to form a diffusion optical dot capable of guiding the beam. The illuminant circuit 141 can include a pair of main guide wires 141a with the high voltage and the low voltage, which is electrically connected to the lighting unit 26 via a pair of subordinate guide wires 141b. Except the core micro patterns cMP1/cMP2 located around the lighting unit 26 and the light entrance hole 31 shown in FIG. 8, in a projection range of the keyswitch 12 and the keycap 24, the micro optical layer 31b is cut into a pair of micro patterns oMP and a pair of micro patterns iMP by the main guide wire 141a and the subordinate guide wire 141b. In the optimized configuration, the non-glued annular area 54B, the adhering component 34 and the related main glued body 54 and the related subordinate glued body 56 and the related/hole 54A are all located between the pair of micro patterns oMP; meanwhile, the non-glued annular area 54B, the adhering component 34 and the related main glued body 54 and the related subordinate glued body 56 and the related hole 54A are all located between the pair of micro patterns iMP. That is to say, the pair of micro patterns oMP is separately located on the two sides of the lighting unit 26, or the pair of micro patterns iMP is separately located on the two sides of the lighting unit 26.

In the preferred configuration of the present invention, a connection line C of the illumination component 26, the hole 54A and the main guide wire 141a, or a connection line C of the illumination component 26, the subordinate glued body 56 and the main guide wire 141a can be utilized to set that the subordinate glued body 56 is located between the main glued body 54 and the main guide wire 141a shown on a top of the figures. In the meantime, an interval Tc between the non-glued annular area 54B and the main guide wire 141a on the connection line C is greater than an interval Ta between the hole 54A and the main guide wire 141a on the connection line C; and the interval Tc between the non-glued annular area 54B and the main guide wire 141a on the connection line C is greater than an interval Tb between the subordinate glued body 56 and the main guide wire 141a on the connection line C. In addition, the interval Tb between the subordinate glued body 56 and the main guide wire 141a on the connection line C is also greater than the interval Ta between the main glued body 54 and the main guide wire 141a on the connection line C. Therefore, in the preferred configuration of the present invention, the connection line C between the illumination component 26, the non-glued annular area 54B, the adhering component 34 and the main guide wire 141a is utilized to set that the interval Tc between the non-glued annular area 54B and the main guide wire 141a on the connection line C is greater than an interval T between the adhering component 34 and the main guide wire 141a on the connection line C.

Refer to FIGS. 6/8/9. The light entrance hole 31 of the light guide plate 30 usually has a small size to prevent the beam from being unnecessary escaped before entering the light entrance hole 31, and the adhering component 52 can be applied to ensure that a relative distance between the lighting unit 26 and the light entrance hole 31 are maintained and fixed. The adhering component 52 can be optionally disposed between the light penetrating membrane 32 and the light guide plate 30, and glued material can be only disposed on a gap of the corresponding keyswitch 12 and between the light penetrating membrane 32 and the light guide plate 30, or the glued material can be only disposed on an outer edge of the light penetrating membrane 32. As the embodiment mentioned above, the adhering component 34 with the light penetrating feature can be used to adjust the beam. The adhering component 34 can include the main glued body 54 (which means the first adhesion body) and the subordinate glued body 56 (which means the second adhesion body).

The main glued body 54 is an annular glued body, the main glued body 54 simultaneously surrounds the light entrance hole 31 of the light guide plate 30 and the lighting unit 26 inside the light entrance hole 31; the subordinate glued body 56 is a glued block at least partly stretched outwardly, the subordinate glued body 56 is far from the light entrance hole 31 and further far from the lighting unit 26 than the main glued body 54. The main glued body 54 can have the hole 54A, and the subordinate glued body 56 is disposed adjacent to the hole 54A; the hole 54A and the subordinate glued body 56 can be any shapes and do not need to correspond to each other; the subordinate glued body 56 can be completely separated from a range of the outer diameter of the main glued body 54, or can be partly connected to the main glued body 54, or can be fully connected to the main glued body 54 (so the hole 54A is merely a notch). In some embodiments, the main glued body 54 and the subordinate glued body 56 can be located on different surfaces of the light guide plate 30. Because the adhering component 34 is a preferred optical channel, the beam can easily penetrate into or penetrate out of the surface of the light guide plate 30, but because the adhering component 34 is close to the lighting unit 26, a part of the beam may frequently penetrate into and out of the light guide plate 30 around the adhering component 34, which results in transmission loss; comparing to that reason, the hole 54A and the outwardly-moving subordinate glued body 56 allow more horizontal transmission of the beam, so as to provide more beams around a stretching straight line from the lighting unit 26 to the hole 54A and the subordinate glued body 56, and to be suitable for the peripheral character that is not easy to be illuminated, such as the subordinate character A2. In the design of foresaid optimization, for ensuring the beam around the subordinate glued body 56 is sufficient and further increasing the backlight uniformity, a distance Da between the subordinate glued body 56 and the subordinate character A2 is smaller than a distance Db between the master glued body 54 and the subordinate character A2; similarly, a distance between the subordinate glued body 56 and an inner edge of the optical frame 322 of the light penetrating membrane 32 (regardless of the light sheltering frame 322*b* or the reflection frame 322*w*) is smaller than a distance between the master glued body 54 and the inner edge of the optical frame 322.

Refer to FIGS. 7/8. The non-glued annular area 54B is set between the adhering component 34 and the light entrance hole 31 of the light guide plate 30 to surround the light entrance hole 31, so as to prevent the adhering component 34 from being moved or flowed to adhere to the lighting unit 26 in a printing process, which results in change of lighting condition or separation of the lighting unit 26 (which is not electrically connected to the illuminant circuit 141), therefore the non-glued annular area 54B is existed between the master glued body 54 and the light entrance hole 31, and also existed between the subordinate glued body 56 and the light entrance hole 31 in necessary. That is, a distance between the subordinate glued body 56 and an inner edge (which may be the light sheltering frame 322*b* or the reflection frame 322*w*) of the optical frame 322 of the light penetrating membrane 32 is smaller than a distance between the non-glued annular area 54B and the inner edge of the optical frame 322; foresaid description is interpreted as configuration of the subordinate glued body 56 and the hole 54A of the main glued body 54 is close to and points toward an orientation capable of increasing the illumination of the character or the uniformity of the halo. That is to say, orthographic projection of the lighting unit 26, the hole 54A of the main glued body 54, and the peripheral character (which means the subordinate character A2) are located on a straight line; because position of the subordinate glued body 56 is close to position of the hole 54A of the master glued body 54, orthographic projection of the lighting unit 26, the subordinate glued body 56, and the peripheral character (which means the subordinate character A2) can be defined as being located on a straight line. However, by considering the halo of the keycap 24 on an area adjacent to the peripheral character, the size of the hole 54A can be used to slightly adjust a beam transmission angle; therefore, it can be interpreted as the peripheral character (and its related projection) can be disposed inside a fan-typed area V stretched from the lighting unit 26 and the hole 54A (which is shown in FIG. 10), or the peripheral character is at least partly overlapped with the fan-typed area V; certainly, the tunnel Hx or the edge wall 31*a* of the light guide plate 30 is preferably not located inside the fan-typed area V stretched from the lighting unit 26 and the hole 54A, so as to prevent serious light leakage. In addition, in different embodiments, the non-glued annular area 54B can be located on the top surface and/or the bottom surface of the light guide plate 30.

Refer to FIGS. 7/8. In the actual manufacturing process, because light transmittance of the optical block 321 of the light penetrating membrane 32 is too low (such as the thickness of the reflection block 321 is too thick, or concentration of reflective components is too high), directly upward place above the lighting unit 26 may result in insufficient illumination, and the (first) character A1 around the lighting unit 26 has the low amount of light output. One of ways of increasing the amount of light output is, increasing the amount of light output of an area around the light entrance hole 31 of the light guide plate 30, so that the foresaid micro optical layers 31*a*/31*b* can be distributed on the area around the light entrance hole 31. As the example shown in FIG. 8, the micro optical layer 31*a* and/or 31*b* has the annular core micro pattern cMP1 and the rectangle core micro pattern cMP2, which are overlapped with the optical block 321 of the light penetrating membrane 32 and the adhering component 34. The annular core micro pattern cMP1 surrounds the light entrance hole 31 and the lighting unit 26, and the optical block 321 and/or the annular core micro pattern cMP1 can be at least partly overlapped with one or a combination of the non-glued annular area 54B, the main glued area 54, the light sheltering block 321*b* and the reflection block 321*w*. Because the reflection block 321*w* can be partly penetrated by the light, upward illumination can be increased by increasing the more area of the core micro pattern cMP1 exceeding the light sheltering block 321*b*. The rectangular core micro pattern cMP2 can be at least partly overlapped with one of the hole 54A of the main glued body 54 and the subordinate glued body 56, or be simultaneously overlapped with both the foresaid elements. Because the hole 54A has larger light horizontal transmittance, a density of the rectangular core micro pattern cMP2 may be probably greater than a density of the annular core micro pattern cMP1, so as to provide the preferred illumination uniformity. As a means of adjusting over-illumination of the hole 54A, a non-microdot area 54C can be possibly disposed on an area of the non-glued annular area 54B and the hole 54A, the non-microdot area 54C can be said as being located between the adhering component 34 and the light entrance hole 31; in a premise of existing the core micro pattern cMP1 and/or cMP2, foresaid design can partly not increase the amount of light output of a place where on the non-microdot area 54C is located.

Refer to FIGS. 5/6/7/8/9. The tunnel Hx can be disposed around any keyswitch 12 of the lighting keyboard 10, even disposed inside a projection range of the keycap 24 of the keyswitch 12, and used to pass through the lighting keyboard 10 and the related backlight module 18; the tunnel Hx can be a heat dissipating hole of a computer system, or be an assembly structural hole of fixing the lighting keyboard 10 and the related backlight module 18. The tunnel Hx is composed of holes on each layer of the lighting keyboard 10 and the related backlight module 18; in detail, the tunnel Hx penetrates through the thin-film circuit board 16, the base plate 23, the light penetrating membrane 32, the light guide plate 30 and the reflection layer 142 and the illuminant circuit board 14 from the top to the down. As mentioned above, the orientation of the place where on the subordinate glued body 56 and the hole 54A are located has more beams transmitted horizontally (which is transmitted via total reflection inside the light guide plate 30), and the beam is leaked via the edge wall 31*a* of the light guide plate 30 where on the tunnel Hx is located. Therefore, for preventing the beam leakage, the illumination component 26, the hole 54A and the tunnel Hx must be not located on a straight line, or it can be said that the illumination component 26, the subordinate glued body 56 and the tunnel Hx are not located on a straight line. In short, the hole 54A and the subordinate glued body 56 that do not face towards the tunnel Hx can considerably reduce the amount of light leakage that can be leaked via the tunnel Hx. In this optimized configuration, an interval between the non-glued annular area 54B and the edge wall 31*a* of a section of the light guide plate 30 is greater than an interval between the adhering component 34 and the edge wall 31*a* of the light guide plate 30, and no matter the edge wall 31*a* with the light leaking feature is substantially located on a through hole sealed by the light guide plate 30, a semi-open hole on the straight edge of the light guide plate 30, or a straight edge wall on the outside of the light guide plate 30 can have the same design. Although the present invention can clearly explain the design program and the technical principle in accordance with the above and following embodiments, the said optimized design are not design choices that can be easily replaced, because the inventor has gone through design verification, prototype verification, and the inventor has gone through design verification, prototype verification, trial production correction and mass production correction for several generations of product models, so as to acquire the research results.

It should be emphasized that the character of the keycap 24 is usually overlapped with the light penetrating area 320 of the light penetrating membrane 32, and the beam emitted from the backlight module 18 can be projected onto the character, but the character is shielded by other component and structure sometimes, or a special relative position and a backlight problem may be appeared due to appearance design, in the meantime, different means are needed to deal with the foresaid situations. As shown in FIG. 7, the main character A1 and the optical block 321 are overlapped, so that actual application can have several means to increase the amount of light output, such as increasing a number of the inner hole 232*c* of the base plate 23 or enlarging the inner hole 232*c* of the base plate 23, forming a hole (such as the light penetrating dots 361 shown in FIG. 5) on the optical block 321, reducing the sheltering block 321*b*, thinning the thickness of the optical block 321 or the reflection block 321*w*, and other manners for increasing the light transmittance of the optical block 321; further, the amount of light output above the LED and adjacent to the problem area is increased by distributing the micro optical layers 31*a*/31*b* on the corresponding character, increasing the density of the micro optical layers 31*a*/31*b*, widening a width of the adhering component 34, and increasing the size of the adhering component 34. As shown in FIG. 7, predicament of the subordinate character A2 is far from the lighting unit 26, and the subordinate character A2 is overlapped with the bridging rib 231*b* of the base plate 23, meanwhile the width and the dimensions of the hole 54A can be increased, the density of the micro optical layers 31*a*/31*b* corresponding to the two side holes 232*b* near by the subordinate character A2 can be increased, the subordinate glued body 56 can be pushed outwardly (so that the subordinate glued body 56 is more far from the lighting unit 26). In addition, because the hole 54A has a specific width, and the beam transmitted outwardly results in a specific diffusion angle, even though the base plate 23 does not have an opening vertically corresponding to the subordinate character A2, the two side holes 232*b* near by the subordinate character A2 can be utilized to illuminate the subordinate character A2.

Figure 10A:
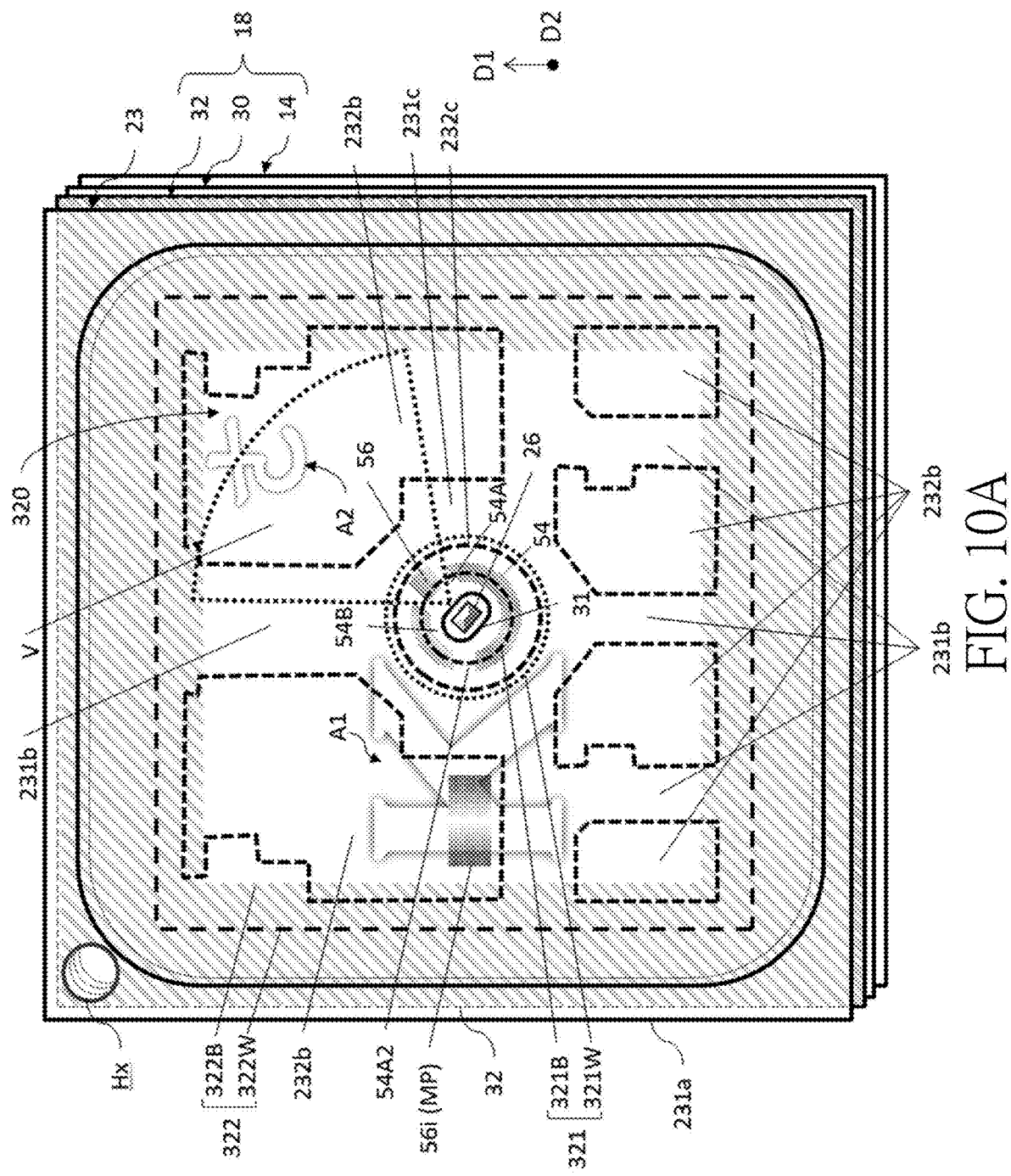
FIG. 10A is a partial overlapped diagram in a range of one keyswitch of the lighting keyboard according to other embodiment of the present invention.
Figure 10B:
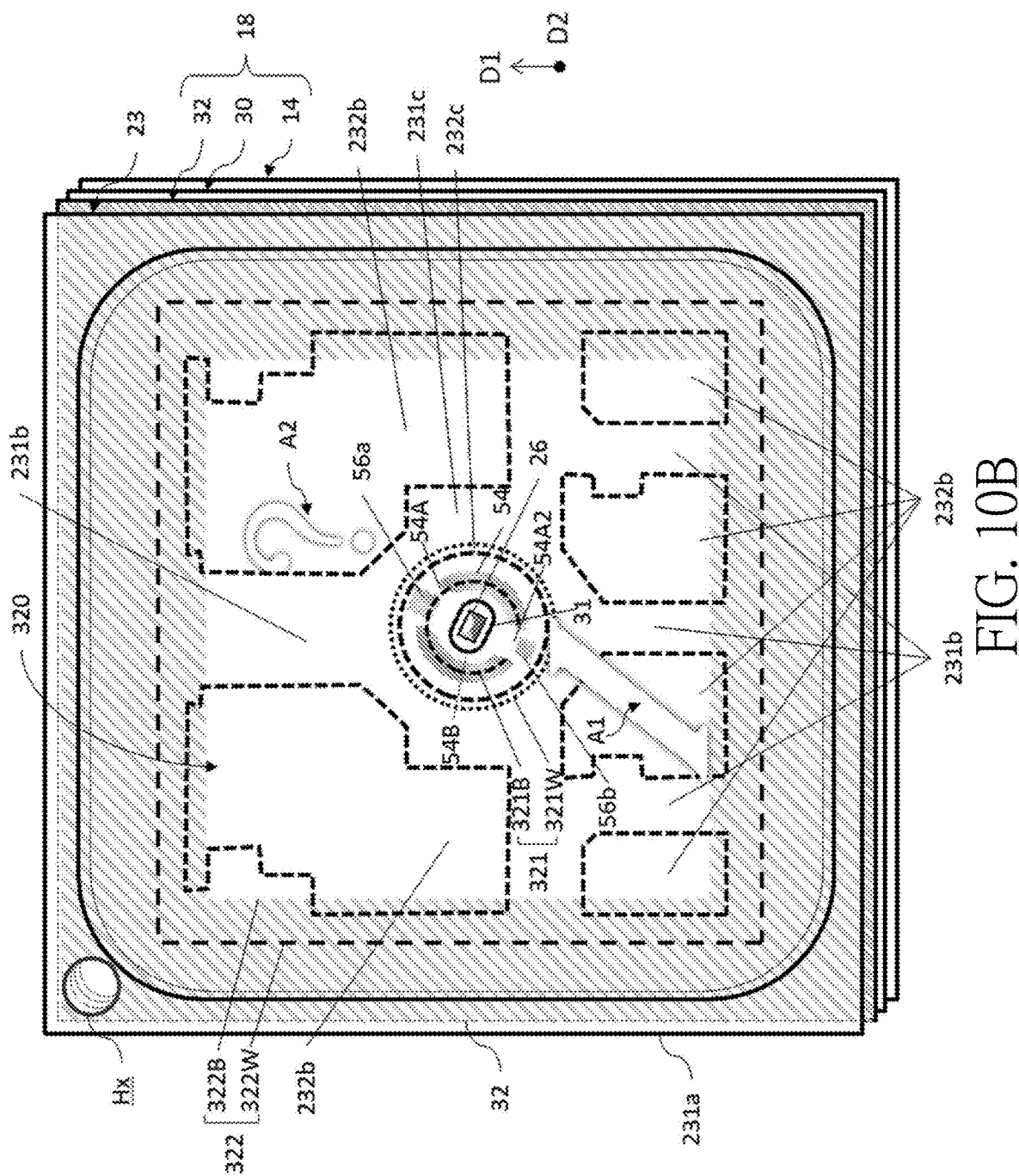
FIG. 10B is a partial overlapped diagram in a range of one keyswitch of the lighting keyboard according to another embodiment of the present invention.

Refer to FIGS. 10A/10B. FIG. 10A is a partial overlapped diagram in a range of one keyswitch 12 of the lighting keyboard 10 according to other embodiment of the present invention. FIG. 10B is a partial overlapped diagram in a range of one keyswitch 12 of the lighting keyboard 10 according to another embodiment of the present invention. A difference between the embodiment shown in FIG. 10 and the embodiment shown in FIG. 7 is: the main character A1 having the large light output area is located between the straight inner edge of the optical frame 322 of the light penetrating membrane 32 and the optical block 321, in the meantime, the main character A1 is partly shielded by the bridging rib 231*b* of the base plate 23; the subordinate character A2 is located inside the side hole 232*b* of the base plate 23. The main glued body 54 shown in FIG. 10A further has a second hole 54A2 used to point towards the main character A1, and the second hole 54A2 is not matched with the subordinate glued body 56. The sizes of the holes 54A and 54A2 can be proportional to the character distance, and further can be proportional to the illumination area of the character; in addition, an included angle between two directions of the holes 54A and 54A2 is similar to or the same as an included angle between two directions of the characters A1/A2 (so that the lighting unit 26 is a center). Because there is not subordinate glued body 56 coupled to the beam for transmitting into and out of the light guide plate 30, more beams can be horizontally transmitted to the three side holes 232*b* on the top, on the middle and on the bottom, and then the beams are transmitted to illuminate the main character A1. That is to say, the holes 54/54A can be used alone, and it is not strictly necessary to use the holes 54/54A with the subordinate glued body 56. Further, if in necessary, the micro patterns MP can be disposed on the micro optical layer 31*a* or 31*b*, and the island glue 56*i* and the micro patterns MP can be additionally disposed on the adhering component 34 and overlapped with each other, the foresaid two elements can be further both overlapped with the side hole 232*b* of the base plate 23 and the main character A1; however, the island glue 56*i* is not overlapped with the optical block 321 or the optical frame 322. Therefore the beam coupling effect of the island glue 56*i* can be used to increase the light output effect of the main character A1. A difference between the embodiment shown in FIG. 10B and the embodiment shown in FIG. 10A is: in addition to the subordinate glued body 56*a* pointing towards the subordinate character A2, the adhering component 34 further has the second subordinate glued body 56*b* pointing towards the main character A1 in the hole 54A2. Besides, as shown in FIG. 10A, the adhering component 34 (which includes the main glued body 56, the holes 54A/54A2, the subordinate glued bodies 56*a*/56*b*, and the non-glued annular area 54B) is all located on the main character A1 and the subordinate character A2, this is optimized design of the adhering component 34 when the main character A1 and the subordinate character A2 are located on opposite sides of the lighting unit 26.

Refer to FIGS. 6/7/8/9/10A/10B. For achieving the preferred light uniformity effect, it is necessary to discuss relative size design of the adhering component 34 and the optical block 321 of the light penetrating membrane 32. First, the outer diameter of the adhering component 34 (which includes the main glued body 54 and the subordinate glued body 56) is preferably greater than a shelter block 231B, this is because if the partial amount of light output increased by the main glued body 54 is completely absorbed or sheltered by the shelter block 231B, it will undoubtedly be an unnecessary loss of the amount of light output. However, when the outer diameter of the adhering component 34 is greater than the inner hole 231*c* of the base plate 23 and overlapped with the annular rib 231*c* of the base plate 23, an optical path can depend on material of the base plate 23; if the base plate 23 is made of reflective metal material, or is coated by reflective ink, the beam still can be recycled. Further, if the outer diameter of the adhering component 34 is greater than a reflective block 321W, the said place is brighter, unless the character is directly above the said place, or a part of the adhering component 34 exceeding the reflective block 321W is overlapped with the reflective annular rib 231c of the base plate 23, and usually the outer diameter of the adhering component 34 is preferably not greater than the reflective block 321W. However, it is also an effective means to increase the controllable amount of light output by allowing the part of the adhering component 34 to exceed (be exposed via) the reflective block 321W. Based on the foresaid configuration, the shelter block 321B is overlapped with the non-glued annular area 54B and a non-microdot area 54C, the outer diameter of the shelter block 321B is also greater than the non-glued annular area 54B and the non-microdot area 54C. In addition, the distance between the non-glued annular area 54B and the inner edge of the optical frame 322 is also greater than the distance between the outer edge of the optical block 321 and the inner edge of the optical frame 322.

According to the optimized configuration of the foresaid embodiments, the illuminant circuit board and the backlight module and the lighting keyswitch of each embodiment of the present invention can achieve the uniformity of light emission of the single keyswitch and the whole keyboard, and can also take into account the uniformity of the light emission of the character and the contour halo of the keycap in each keyswitch, for achieving the preferred backlight effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module, comprising:
a light penetrating membrane, having an optical block, an optical frame, and a light penetrating area defined between the optical block and the optical frame;
a reflection layer located under the light penetrating membrane;
a lighting unit located under the light penetrating membrane, and protruding from the reflection layer;
a light guide plate located between the light penetrating membrane and the reflection layer, the light guide plate having a light entrance hole adapted to accommodate the lighting unit;
at least one adhering component, at least partly surrounding the light entrance hole of the light guide plate, the adhering component defining a non-glued annular area, the non-glued annular area being located between the adhering component and the lighting unit;
wherein, the optical block is located above the lighting unit, and a distance between the non-glued annular area and the optical frame of the light penetrating membrane is greater than a distance between the optical block and the optical frame.

2. The backlight module of claim 1, wherein the reflection layer comprises at least one pair of micro patterns separately located on two sides of the lighting unit.

3. The backlight module of claim 1, wherein the light guide plate has an edge wall with a light leaking feature, a distance between the non-glued annular area and the edge wall of the light guide plate is greater than a distance between the adhering component and the edge wall.

4. The backlight module of claim 1, wherein the reflection layer comprises at least one pair of micro patterns separately located on two sides of the lighting unit, the adhering component comprises an island glue, the island glue is at least partly overlapped with at least one of the pair of micro patterns.

5. The backlight module of claim 1, wherein the adhering component comprises a main glued body and a subordinate glued body, the main glued body at least partly surrounds the lighting unit, and the main glued body has a hole, the subordinate glued body is at least partly overlapped with the hole.

6. The backlight module of claim 5, wherein the reflection layer comprises at least one core micro pattern disposed adjacent to the lighting unit, wherein the core micro pattern is overlapped with at least one of the non-glued annular area, the main glued body, the subordinate glued body, and the hole of the main glued body.

7. The backlight module of claim 5, wherein a distance between the subordinate glued body and the optical frame is smaller than a distance between the non-glued annular area and the optical frame.

8. The backlight module of claim 5, further comprising a tunnel penetrating through the backlight module, the tunnel is not located in a fan-typed area stretched from the lighting unit and the hole of the main glued body.

9. The backlight module of claim 5, wherein the reflection layer comprises at least one pair of micro patterns separately located on two sides of the lighting unit, and at least one of the non-glued annular area, the adhering component, the main glued body, the subordinate glued body, and the hole of the main glued body is located between the pair of micro patterns.

10. The backlight module of claim 5, wherein the backlight module is adapted to illuminate at least one character of a lighting keyboard, a distance between the subordinate glued body and the character is smaller than a distance between the main glued body and the optical frame.

11. The backlight module of claim 1, wherein the backlight module is adapted to illuminate a main character of a lighting keyboard, and the optical block of the light penetrating membrane is partly overlapped with the main character.

12. The backlight module of claim 1, wherein the backlight module is adapted to illuminate a main character of a lighting keyboard, and the main character is located between the optical block and the optical frame.

13. The backlight module of claim 1, wherein the backlight module is adapted to illuminate two characters of a lighting keyboard, the non-glued annular area is located between the two characters.

14. The backlight module of claim 1, wherein the backlight module is adapted to illuminate a character of a lighting keyboard, and the adhering component has a hole, a fan-typed area is stretched from the lighting unit and the hole, the character is at least partly overlapped with the fan-typed area.

15. The backlight module of claim 1, wherein the optical block is at least partly overlapped with one of the non-glued annular area and the adhering component.

16. The backlight module of claim 1, further comprising at least one pair of guide wires located under the reflection layer, the adhering component is located between the non-glued annular area and one of the at least one pair of guide wires, a distance between the non-glued annular area and the foresaid guide wire is greater than a distance between the adhering component and the foresaid guide wire.

17. A lighting keyswitch comprising:
a keycap, comprising at least one character;

a backlight module of claim 1 disposed under the keycap, the backlight module providing a beam to illuminate the character.

18. A backlight module, comprising:
- a light penetrating membrane, having an optical block, an optical frame, and a light penetrating area defined between the optical block and the optical frame;
- a reflection layer located under the light penetrating membrane, two micro patterns being separately disposed on an upper surface of the reflection layer;
- a lighting unit located under the light penetrating membrane, and protruding from the reflection layer;
- a light guide plate located between the light penetrating membrane and the reflection layer, the light guide plate having a light entrance hole adapted to accommodate the lighting unit;
- at least one adhering component located above the reflection layer, the adhering component at least partly surrounding the lighting unit, and the adhering component being located between the two micro patterns.

19. An illuminant circuit board comprising:
- a substrate;
- an illuminant circuit located on the substrate, the illuminant circuit comprising at least one pair of guide wires at least not partly overlapped with each other;
- at least one lighting unit electrically connected to the at least one pair of guide wires;
- a reflection layer covering the illuminant circuit, two micro patterns being separately disposed on an upper surface of the reflection layer, and further separately located on two sides of the lighting unit;
- an adhering component disposed above the reflection layer, the adhering component at least partly surrounding the lighting unit, and the adhering component being located between the two micro patterns;
- wherein the reflection layer comprises at least one core micro pattern disposed adjacent to the lighting unit, the core micro pattern is at least partly located between the adhering component and the lighting unit.

20. The illuminant circuit board of claim 19, wherein the adhering component comprises a main glued body and a subordinate glued body, the main glued body at least partly surrounds the lighting unit, and the main glued body has a hole, the subordinate glued body is at least partly overlapped with the hole.

21. The illuminant circuit board of claim 20, wherein the subordinate glued body is located between the main glued body and one of the at least one pair of guide wires, a distance between the subordinate glued body and the foresaid guide wire is smaller than a distance between the main glued body and the foresaid guide wire.

22. The illuminant circuit board of claim 19, wherein the adhering component comprises an island glue, the island glue is at least partly overlapped with at least one of the pair of micro patterns.

23. A backlight module, comprising:
- a light penetrating membrane, having an optical block, an optical frame, and a light penetrating area defined between the optical block and the optical frame;
- a light guide plate located under the light penetrating membrane, the light guide plate having a light entrance hole corresponding to the optical frame;
- an illuminant circuit board of claim 19, the illuminant circuit board being located under the light guide plate.

* * * * *